United States Patent [19]
Kunze

[11] Patent Number: 5,798,898
[45] Date of Patent: Aug. 25, 1998

[54] MAGNETIC HEAD WITH A TAPE-GUIDE DEVICE

[75] Inventor: Norbert Kunze, Ehringshausen, Germany

[73] Assignee: U.S. Philips Corporation, New York, N.Y.

[21] Appl. No.: 646,827

[22] Filed: May 21, 1996

[30]  Foreign Application Priority Data

May 26, 1995 [DE] Germany ................ 195 19 371.7

[51] Int. Cl.$^6$ .................. G11B 5/10; G11B 15/60
[52] U.S. Cl. ................................ 360/130.21
[58] Field of Search .............. 360/130.2, 130.21; 242/346, 346.1, 346.2, 358; 226/196, 199

[56] References Cited

U.S. PATENT DOCUMENTS

| | | | |
|---|---|---|---|
| 4,586,098 | 4/1986 | Pretto | 360/109 |
| 4,860,141 | 8/1989 | Yoshimura | 360/130.21 |
| 4,926,278 | 5/1990 | Schoenmakers | 360/130.21 |
| 4,962,438 | 10/1990 | Kunze | 360/130.21 |
| 5,134,536 | 7/1992 | Komatsu et al. | 360/130.21 |
| 5,202,808 | 4/1993 | Saito | 360/130.21 |
| 5,253,135 | 10/1993 | Hamana | 360/130.21 |
| 5,357,390 | 10/1994 | Vollmann | 360/130.21 |
| 5,610,787 | 3/1997 | Kunze et al. | 360/130.21 |

FOREIGN PATENT DOCUMENTS

| | | | |
|---|---|---|---|
| 120518 | 10/1984 | European Pat. Off. | 360/130.21 |
| 0442512A2 | 8/1991 | European Pat. Off. | |
| 58-17514 | 2/1983 | Japan | 360/130.21 |
| 58-56214 | 4/1983 | Japan | 360/130.21 |
| 58-199417 | 11/1983 | Japan | 360/130.21 |
| 62-67758 | 3/1987 | Japan | 360/130.21 |
| 2-62747 | 3/1990 | Japan | 360/130.21 |
| 2-149965 | 6/1990 | Japan | 360/130.21 |
| 6-195825 | 7/1994 | Japan | 360/130.21 |

*Primary Examiner*—Stuart S. Levy
*Assistant Examiner*—David L. Ometz
*Attorney, Agent, or Firm*—John C. Fox

[57]  ABSTRACT

The invention relates to a magnetic head (2) for a magnetic-tape-cassette apparatus having a tape-guide device for a magnetic tape (7), wherein the device has a first (6b) and a second (6c) tape guide arranged at both sides of the magnetic head (2) in the direct proximity thereof, the first and the second tape guide (6b, 6c) being fork-shaped and having projecting guide limbs ($6b_1$, $6b_2$, $6c_1$, $6c_2$) which bound a transport path (7a) of the magnetic tape (7), the magnetic head (2) being mounted in a holder (11) of a first plastic frame (1), and a second plastic frame (5), which comprises the first and the second tape guides (6b, 6c), being aligned in a given manner relative to the magnetic head (2) and being secured to the first plastic frame (1).

6 Claims, 2 Drawing Sheets

MAGNETIC HEAD WITH A TAPE-GUIDE DEVICE

BACKGROUND OF THE INVENTION

The invention relates to a magnetic head for a magnetic-tape-cassette apparatus, comprising a tape-guide device for a magnetic tape, wherein the device comprises a first and a second tape guide arranged at both sides of the magnetic head in the direct proximity thereof, the first and the second tape guide being fork-shaped and having projecting guide limbs which bound a transport path of the magnetic tape.

Tape-guide devices for magnetic heads serve to ensure that the magnetic tracks of the magnetic tape and the head gaps of the magnetic head always coincide exactly.

Such a device is known from, for example, EP 442,512. In accordance with the document there has been provided an injection-molded plastic part comprising a holder for a magnetic head and inner tape guides in the direct proximity of the magnetic head at both sides of the magnetic head. In addition, the same injection-molded plastic part further comprises outer tape guides, which are spaced from the inner tape guides and which guide the magnetic tape at both sides of the magnetic head over a greater length. The tape guides are fork-shaped and, consequently, they have guide limbs past which the tape can be moved. All the tape guides and the positioning holder are constructed as an integrally injection-molded plastic part.

In order to mount the magnetic head in the holder of the injection-molded plastic part it should first be placed in the holder and be aligned relative to the head gaps of the magnetic head. Subsequently, the magnetic head is secured in its holder in this aligned position, for example by gluing.

However, a gluing process has some drawbacks. First of all, the adhesive should be allowed to cure after it has been introduced into the magnetic head holder, which results in a time delay in the production process. Moreover, the magnetic head may be soiled with residual adhesive. Finally, the adhesive waste forms an unnecessary environmental pollution.

Securing the magnetic head in the holder of the injection-molded plastic part with the guides by means of a welding process is not possible owing to the different materials of the plastic frame and the magnetic head.

OBJECTS AND SUMMARY OF THE INVENTION

It is an object of the present invention to construct the magnetic head with its tape guides in such a manner that it can be manufactured with the tape guides aligned relative to the head gaps of the magnetic head in a rapid, clean and reliable production process.

According to the invention this object is achieved in that the magnetic head is mounted in a holder of a first plastic frame, and a second plastic frame, which comprises the first and the second tape guides, is aligned in a given manner relative to the magnetic head and is secured to the first plastic frame.

The magnetic head is interlocked or frictionally mounted in the holder of the first plastic frame, particularly by clamping or snapping-in. The second plastic frame, which comprises the tape guides, can then be aligned relative to the head gaps of the magnetic head and can subsequently be secured to the first plastic frame in this aligned condition. This mounting process can be realized by means of a welding process. By the provision of two initially separate plastic frames, of which one frame comprises the holder for the magnetic head and the other frame comprises the tape guides, the magnetic head with the tape guides aligned relative to its head gaps can be manufactured rapidly, cleanly, without soiling of the magnetic head, without the use of a gluing method and with a high and reproducible alignment accuracy.

An advantageous embodiment of the invention is characterized in that the second plastic frame comprises a third and a fourth tape guide arranged one on either side of the magnetic head and at a larger distance than the respective first and second tape guides adjacent said head, the third and the fourth tape guide each being fork-shaped and having projecting guide limbs which bound the transport path of the magnetic tape.

The construction of the magnetic head in accordance with the invention makes it possible to use a plurality of different tape guides. The second plastic frame may, for example, also comprise four tape guides, thereby ensuring that the magnetic tape is guided over a greater length.

A further advantageous embodiment of the invention is characterized in that the first plastic frame comprises at least two mounting limbs which project freely away from the magnetic head, and the second plastic frame has been secured to the mounting limbs of the first plastic frame.

By means of the freely projecting mounting limbs the second plastic frame can be secured to the mounting limbs of the first plastic frame in a particularly simple and reliable manner.

A further advantageous embodiment of the invention is characterized in that the second plastic frame has been secured to the mounting limbs of the first plastic frame between the first and the third tape guide and between the second and the fourth tape guide.

This is a particularly simple and reliable fixing method.

A further advantageous embodiment of the invention is characterized in that the first and the second plastic frame have been welded to one another.

A magnetic head in accordance with the invention can be manufactured by methods which are characterized in that the second plastic frame is fixedly secured to the first plastic frame by means of a welding process.

The provision of two plastic frames to be secured to one another makes it possible to use a welding process. First of all, the magnetic head is, for example, interlocked or frictionally mounted in that it is clamped or snapped into the holder of the first plastic frame. After this, the second plastic frame is aligned relative to the head gaps of the magnetic head mounted in the holder of the first plastic frame. Subsequently, the two plastic frames are secured to one another in this aligned condition by means of a welding process.

In the case of a magnetic head constructed in accordance with EP 442,512 the magnetic head is directly aligned relative to the single plastic frame and should then be secured by means of a fixing method. A welding process is then not possible owing to the different materials of the plastic frame and the magnetic head.

An advantageous variant of the method is characterized in that the welding process takes place between the first and the third tape guide and the second and the fourth tape guide.

This method is particularly favorable from the point of view of production engineering because the magnetic head is disposed comparatively far from the welding points.

An advantageous variant of the method is characterized in that the welding process is an ultrasonic welding process or a laser welding process.

These two welding processes are particularly suitable for welding two plastic parts to one another.

The magnetic head in accordance with the invention is preferably used in a tape deck or in a magnetic-tape-cassette apparatus comprising a tape deck.

BRIEF DESCRIPTION OF THE DRAWINGS

An embodiment of the invention will now be described in more detail with reference to the drawing. In the drawing.

DESCRIPTION OF THE PREFERRED EMBODIMENTS

Figure 1:
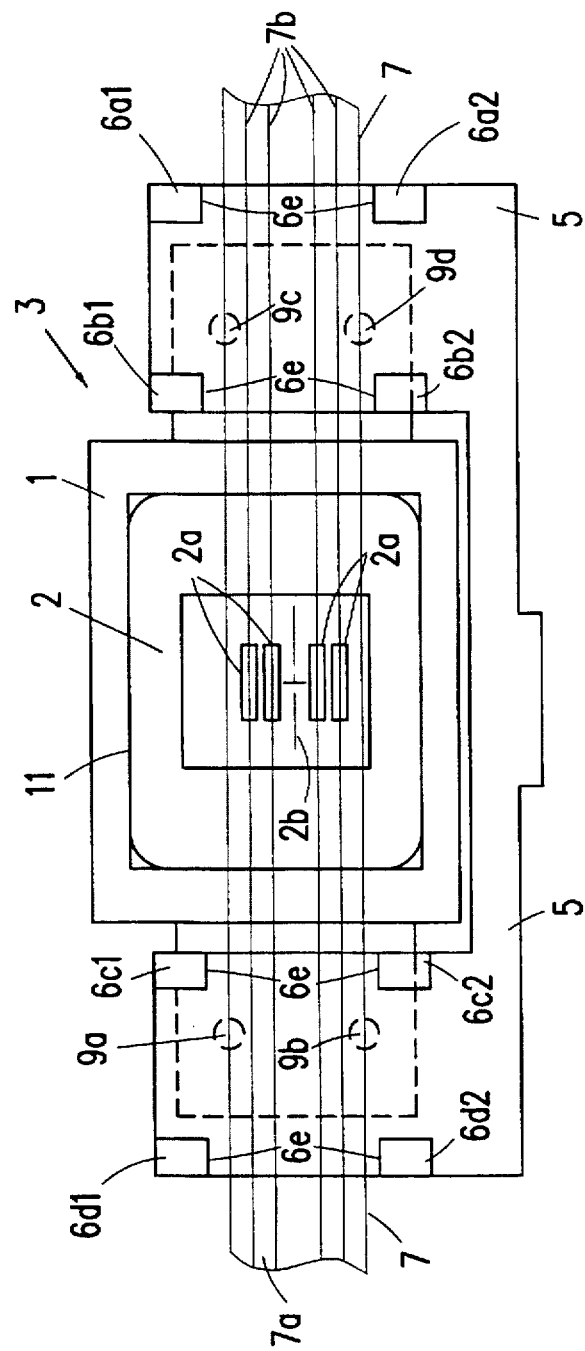
FIG. 1 diagrammatically shows a magnetic head with a tape-guide device aligned relative to head gaps of this magnetic head, viewed at a plane of transport of the magnetic tape.
Figure 2:
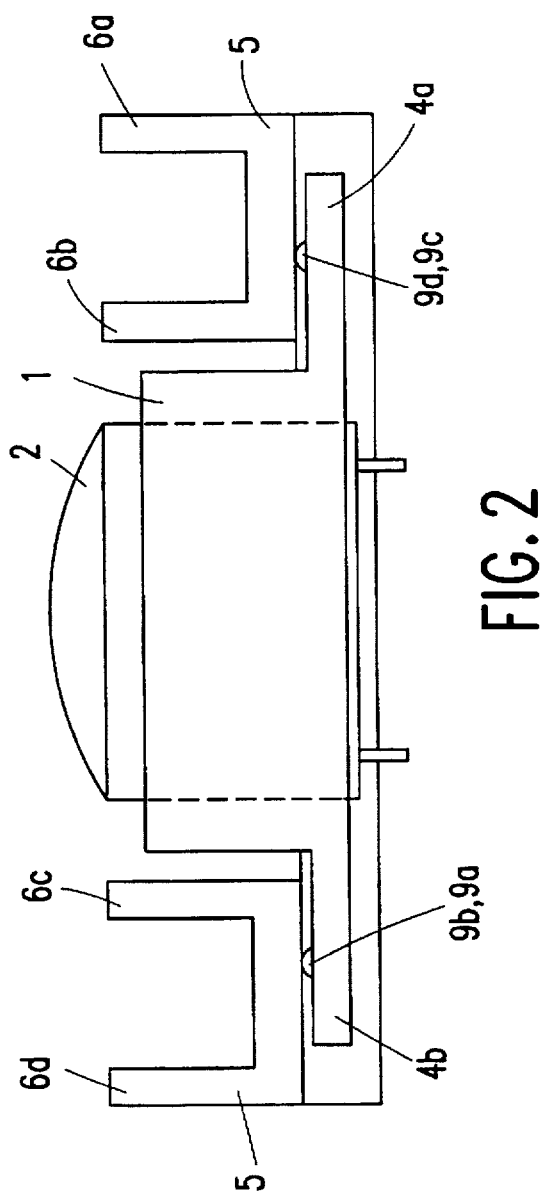
FIG. 2 is a side view of the magnetic head with the tape-guide device, viewed at a plane perpendicular to the plane of transport of the magnetic tape.

A magnetic head/tape-guide unit 3 of a magnetic-tape-cassette apparatus, shown in FIG. 1, comprises a first plastic frame 1 with a holder 11, in which a magnetic head 2 has been mounted frictionally or positively, for example by clamping or snapping. The first plastic frame 1 has two mounting limbs 4a and 4b. The magnetic head 2 has four head gaps 2a, which are vertically spaced from a central axis 2b. There has been provided a second plastic frame 5 comprising four tape guides 6a to 6d. Each of the four tape guides 6a to 6d is fork-shaped and has two guide limbs 6a1, 6a2, 6b1, 6b2, 6c1, 6c2, 6d1, 6d2. All the guide limbs have contact surfaces 6e which extend perpendicularly to a plane of transport 7a of a magnetic tape 7 having four magnetic tracks 7b. FIG. 2 shows the magnetic head/tape-guide unit 3 in a view at a plane perpendicular to the plane of transport 7a of the magnetic tape 7.

There are four welds 9a to 9d, where the mounting limbs 4a and 4b of the plastic frame 1 have been welded to the plastic frame 5.

For the correct operation of the magnetic head/tape-guide unit 3 it is important that the magnetic tracks 7b of the magnetic tape 7 and the associated head gaps 2a of the magnetic head 2 always coincide exactly. In order to guarantee this, the contact surfaces 6e of the tape guides 6a to 6d should extend exactly parallel to the head gaps 2a of the magnetic head 2.

Owing to the provision of two initially separate plastic frames 1 and 5 the manufacture of the magnetic head/tape-guide unit 3 with contact surfaces 6e of the tape guides 6a to 6d which extend exactly parallel to the head gaps 2a of the magnetic head 2 can be effected as follows:

First of all, the magnetic head 2 is frictionally mounted in the holder 11 of the first plastic frame 1 in that it is clamped or snapped in position by hand. The first plastic frame 1 has no tape guides and therefore it need not be aligned relative to the head gaps of the magnetic head. However, care must be taken that the relative position of the magnetic head 2 with respect to the holder 11 of the plastic frame 1 does not change as a result of forces exerted on the magnetic head 2 in operation of the magnetic-tape-cassette apparatus.

Subsequently, the second plastic frame 5 is aligned with its tape guide elements 6a to 6d relative to the head gaps 2a of the magnetic head 2 which has been clamped or snapped into the holder 11 of the first plastic frame 1.

The two plastic frames 1 and 5 should now be fixedly connected to one another in this aligned condition. This is preferably effected by means of a welding process, particularly laser welding or ultrasonic welding. The second plastic frame 5 is now welded to the first plastic frame 1, for example at the welding points 9a to 9d.

This results in a magnetic head/tape-guide unit 3 whose tape guides 6a to 6d are in alignment with the head gaps 2a of the magnetic head 2.

The entire magnetic head/tape-guide unit 3 can now be clamped or snapped into a holder, not shown, on the head-mounting plate of a magnetic-tape-cassette apparatus, or it can be secured thereto in another way.

I claim:

1. A magnetic head/tape guide unit for a magnetic-tape-cassette apparatus, comprising a magnetic head mounted in a holder of a first plastic frame, the first plastic frame comprising at least two mounting limbs which project freely away from the magnetic head, and a second plastic frame aligned in a given manner relative to the magnetic head and secured to the mounting limbs of the first plastic frame, the second plastic frame supporting a tape-guide device for a magnetic tape, the tape-guide device comprises a first and a second tape guide arranged at both sides of the magnetic head in direct proximity thereof, the first and the second tape guides being fork-shaped and having projecting guide limbs which bound a transport path of the magnetic tape, the tape guide device also comprising a third and a fourth tape guide arranged one on either side of the magnetic head and at a larger distance than the respective first and second tape guides adjacent said magnetic head, the third and the fourth tape guide each being fork-shaped and having projecting guide limbs which bound the transport path of the magnetic tape, characterized in that the second plastic frame has been secured to the mounting limbs of the first plastic frame between the first and the third tape guides and between the second and the fourth tape guides.

2. A magnetic head/tape guide unit as claimed in claim 1, characterized in that the first and the second plastic frame have been welded to one another.

3. A method of manufacturing a magnetic head as claimed in claim 1, characterized in that the second plastic frame is fixedly secured to the first plastic frame by forming welds between the first and the third tape guide and the second and the fourth tape guide.

4. A method as claimed in claim 3, characterized in that the welds are formed either by an ultrasonic welding process or a laser welding process.

5. A tape deck comprising a magnetic head/tape guide unit as claimed in claim 1.

6. A magnetic-tape-cassette apparatus comprising a tape deck as claimed in claim 5.

* * * * *